UNITED STATES PATENT OFFICE.

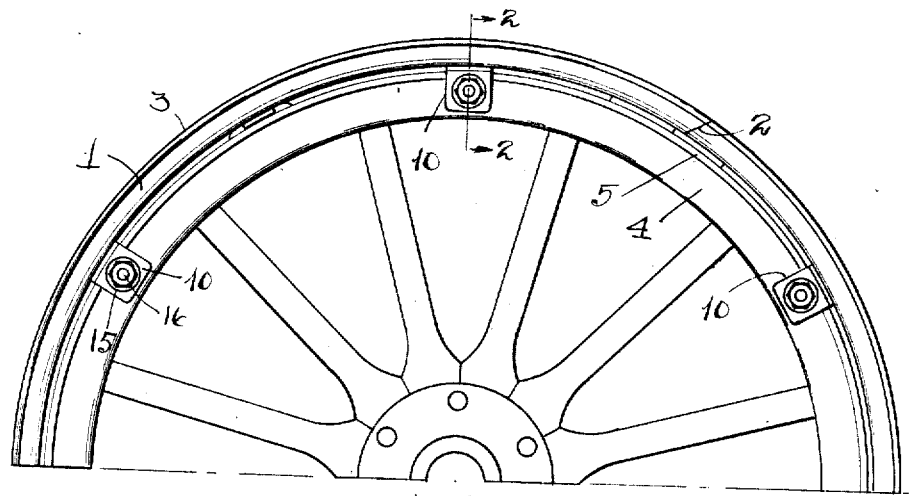
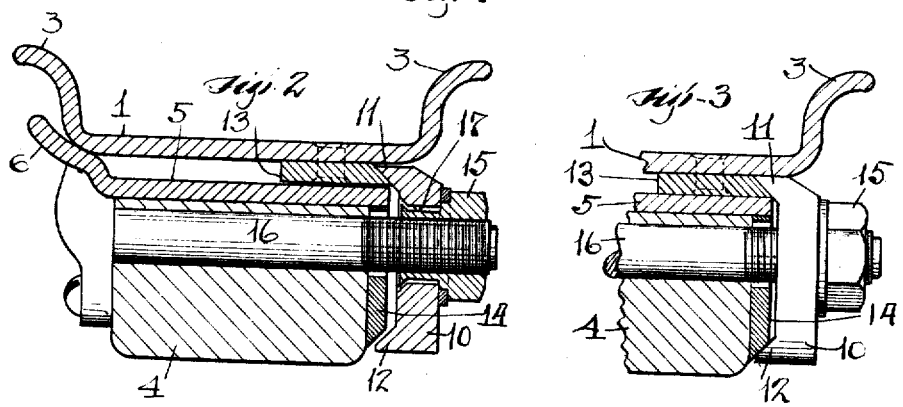
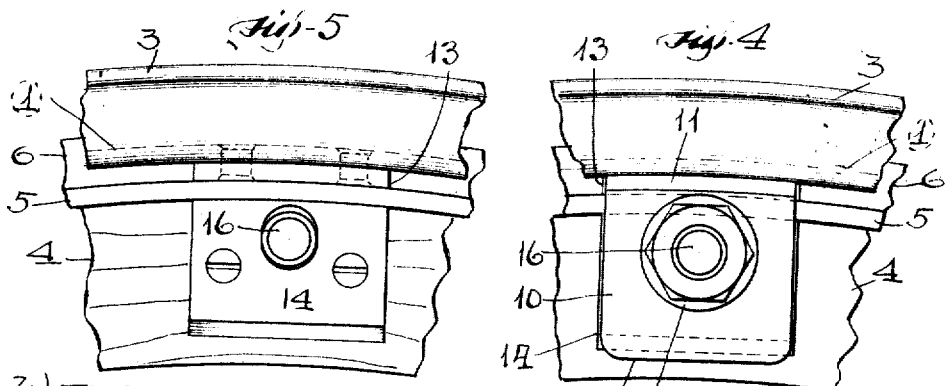

CHARLES W. GRESSLE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-WHEEL WITH DEMOUNTABLE RIM.

1,264,178.

Specification of Letters Patent.  Patented Apr. 30, 1918.

Application filed April 7, 1916. Serial No. 89,631.

*To all whom it may concern:*

Be it known that I, CHARLES W. GRESSLE, a citizen of the United States, and a resident of Cleveland, county of Cuyahoga, State of Ohio, have invented a new and useful Improvement in Vehicle-Wheels with Demountable Rims, of which the following is a specification, the principle of the invention being herein explained and the best mode in which I have contemplated applying that principle, so as to distinguish it from other inventions.

The present improvements constitute in effect a modification in the construction of vehicle wheels with demountable rims, which forms the subject matter of a copending application filed April 7, 1916, by Lee V. Annable, Serial No. 89,624. In both constructions a combination wedging and tying action is utilized to secure, or lock, the demountable rim onto the wheel body, the inner side or edge of such rim being directly fitted onto a beveled or inclined seat on the adjacent side of the felly-band, or wheel body, while the outer side of such rim is secured to the wheel body by means of devices which pull radially inwardly on the same at circumferentially spaced points.

The object of the present invention is the provision of a simpler and more easily manufactured structure adapted to operate on this principle, utilizing felly-bands and rims of the same general style and dimensions as are at present used in the manufacture of so-called Continental demountable rims, wherein the rim is secured in place wholly by a wedging action. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1 is an elevation of a half of a wheel and rim, with my improved locking means in place; Fig. 2 is a transverse section of such wheel and rim taken on the plane indicated by the line 2—2, Fig. 1, the locking means being shown in a position approaching the final operative position; Fig. 3 is a broken sectional view similar to Fig. 2, but showing such locking means in final operative position; Fig. 4 is a side elevation on a larger scale than in Fig. 1, of a portion of the wheel body and rim showing one of the devices constituting the locking means; and Fig. 5 is a view similar to Fig. 4 but with a portion of such locking device removed, showing the coöperative elements of the rim and wheel body.

The form of demountable rim 1 illustrated is similar to that currently in use, known as the Continental rim, and may be either a continuous rim, or transplit as shown at 2, in Fig. 1, or it may be made of sectional construction, as will be readily understood, such modifications in construction having nothing to do with the present invention. As illustrated, moreover, said rim is shown with side flanges 3, adapting it to receive and support a straight-sided tire, but obviously these flanges may be clencher flanges for use with the corresponding type of tire if desired. The wheel body, likewise, is in the main a familiar construction, including a felly 4, surrounded by a felly-band 5, the rear edge of which is bent radially outward so as to form an inclined flange 6, with which the rear edge of the rim 1, when in seated position on the wheel, is designed to engage.

In such Continental rim construction, as heretofore utilized, a plurality of wedges are introduced in circumferentially spaced relation between the outer edge of the rim and the corresponding edge of the fellyband in order to securely lock the rim in place, the effect being to place the rim under tension as it were, by reason of the outward component of the force exerted by the several wedges.

In the present construction, however, instead of such wedge elements, I provide a series of clamps 10, the action of which, as previously indicated, is to draw the rim at circumferentially spaced points around its front side or outer edge. Preferably, these clamps 10 take on the form of plates having their respective upper and lower ends 11 and 12 bent inwardly at an obtuse angle to the body of the clamp.

Such upper inwardly bent end 11 of each clamp plate, is adapted to engage with the correspondingly beveled outwardly directed edge of a plate 13 fixedly attached to the under side of the rim. A series of such plates is provided, equal in number to the number of clamps used and respectively alined therewith, such plates being either riveted or welded to such rim, or else stamped up integrally from the material of the rim, as desired. The lower inwardly bent ends 12 of the respective clamp plates 10 are adapted to engage correspondingly beveled edges on plates 14 fixedly attached to the front face of the felly and so constituting, in effect, an integral part of the wheel body.

Movement of the clamps transversely of such wheel body is conveniently effected by means of nuts 15 on the ends of transversely disposed bolts 16 projecting through the side of the felly and the aforesaid plates 14, the clamps being preferably swiveled onto such nuts, so as to be carried outwardly as well as inwardly. The openings 17 in the clamps, however, whereby they are thus swiveled onto the nuts, are elongated a trifle in a radial direction, so that a certain amount of movement is permitted the clamps in such direction, for the reason which will presently appear.

The thickness of the plates 13 on the inner face of the rim is such that they very nearly, but not quite, equal the radial distance between the outer face of the felly-band and the inner face of the rim, in the latter's normal condition.

With the clamps out of the way, accordingly, such rim may be readily slipped onto the felly-band or removed therefrom. When thus slipped on, the inner side or edge of the rim seats upon the inclined flange 6, that extends around the corresponding edge of the felly-band, thereby securing a continuous circumferential support for such rim-side. Upon applying the clamps 10 to the several bolts 16 by threading the corresponding nuts 15 onto such bolts, said clamps will initially occupy the position shown in Fig. 2, wherein it will be seen that the lugs or plates 13 have a slight clearance, or working fit with respect to the felly-band. The distance however, between the respective inwardly bent or angular ends of the clamps, is such that upon drawing up the nuts on the bolts, so as to force such clamps transversely of the wheel body, the plates on the rim, as well as the attached portions of the rim itself, are drawn or pulled radially inwardly, until such lugs rest solidly upon the outer face of the felly-band.

A slight buckling in an outward radial direction may be produced in the several arcs of the rim intermediate between successive clamps, but this is inconsequential and does not in any way affect the security of the mounting, the pressure of the load on such intermediate portions of the rim being transmitted, as by a truss, to the supporting lugs adjacent the corresponding clamps. In order to remove the rim, it will be obvious that all that is necessary is to release the clamps and either swing them out of the way, (if properly dimensioned) or else remove them, together with the nuts to which they are attached, entirely from the bolts, whereupon the rim may be taken off in the usual fashion.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

The combination with a wheel having a transversely beveled, outwardly inclined surface adjacent its one edge and a series of circumferentially spaced plates on its opposite side, said plates having inclined faces adjacent their lower edges; of a demountable rim for said wheel body having one side formed to seat on such outwardly inclined surface; a series of plates having beveled edges attached to the under side of said rim, bolts mounted through said wheel and said plates, and a series of clamps movably mounted on said bolts and having their upper and lower surfaces bent inwardly and adapted to engage with the inclined faces of said plates, and means for moving said clamps inwardly on said bolts to clamp said rim to said wheel.

Signed by me, this 1st day of April, 1916.

CHARLES W. GRESSLE.

Attested by—
   JOHN C. MANTERNACH,
   HOWARD A. FLAGG.